March 18, 1958 G. B. HATCHER 2,826,967
CARTON ERECTING MACHINE
Filed May 11, 1956 9 Sheets-Sheet 1

INVENTOR.
GLENN B. HATCHER
BY
HIS ATTORNEY

March 18, 1958     G. B. HATCHER     2,826,967
CARTON ERECTING MACHINE
Filed May 11, 1956     9 Sheets-Sheet 2

INVENTOR.
GLENN B. HATCHER
BY
*Edward H. Dumpston*
HIS ATTORNEY

March 18, 1958  G. B. HATCHER  2,826,967
CARTON ERECTING MACHINE
Filed May 11, 1956  9 Sheets-Sheet 3
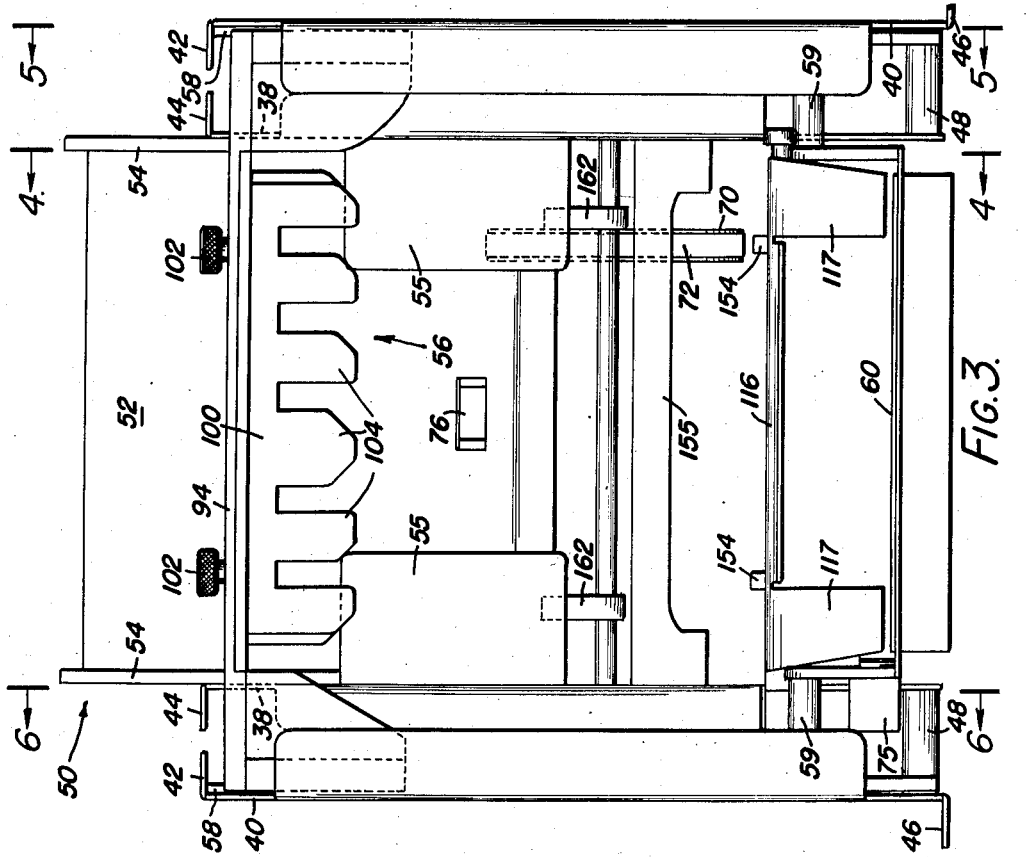
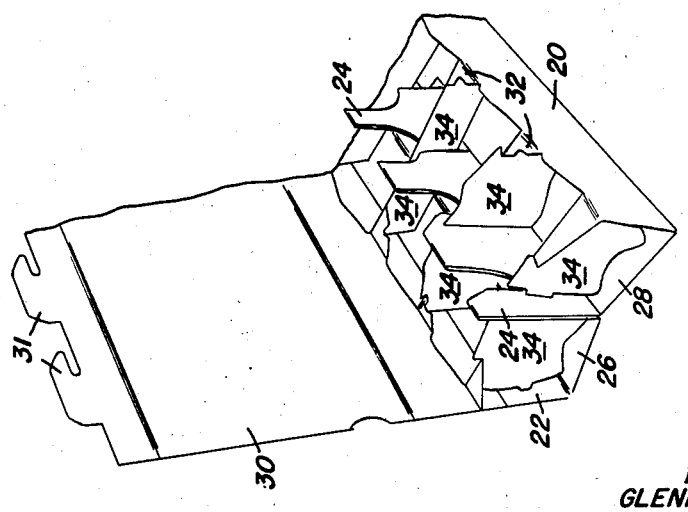
INVENTOR.
GLENN B. HATCHER
BY
*Edward H. Dumpston*
HIS ATTORNEY March 18, 1958

G. B. HATCHER 2,826,967

CARTON ERECTING MACHINE

Filed May 11, 1956

INVENTOR.
GLENN B. HATCHER
BY
*Edward N. Lumpston*
HIS ATTORNEY

March 18, 1958  G. B. HATCHER  2,826,967
CARTON ERECTING MACHINE

Filed May 11, 1956  9 Sheets-Sheet 5

INVENTOR.
GLENN B. HATCHER
BY
HIS ATTORNEY

March 18, 1958

G. B. HATCHER 2,826,967

CARTON ERECTING MACHINE

Filed May 11, 1956

INVENTOR.
GLENN B. HATCHER
BY
HIS ATTORNEY

March 18, 1958

G. B. HATCHER 2,826,967

CARTON ERECTING MACHINE

Filed May 11, 1956

INVENTOR.
GLENN B. HATCHER
BY
Edward H. Dumpston
HIS ATTORNEY

March 18, 1958
G. B. HATCHER
2,826,967
CARTON ERECTING MACHINE
Filed May 11, 1956
9 Sheets-Sheet 8
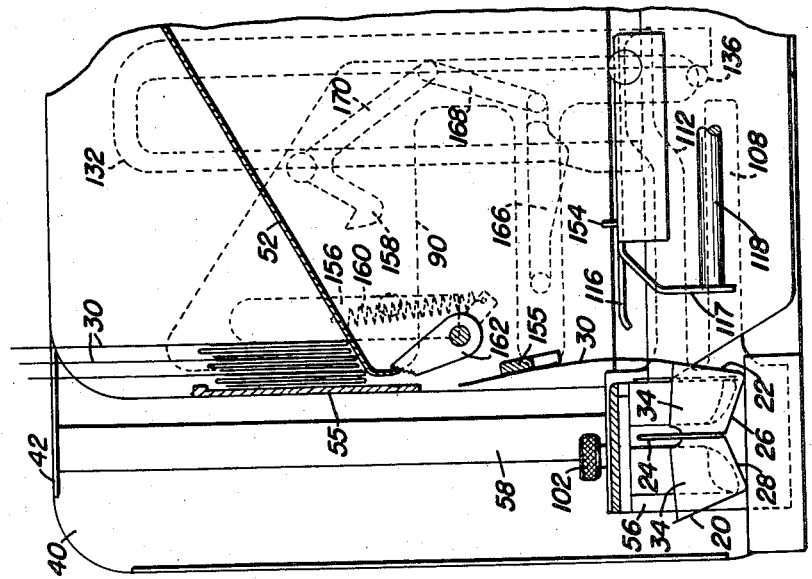
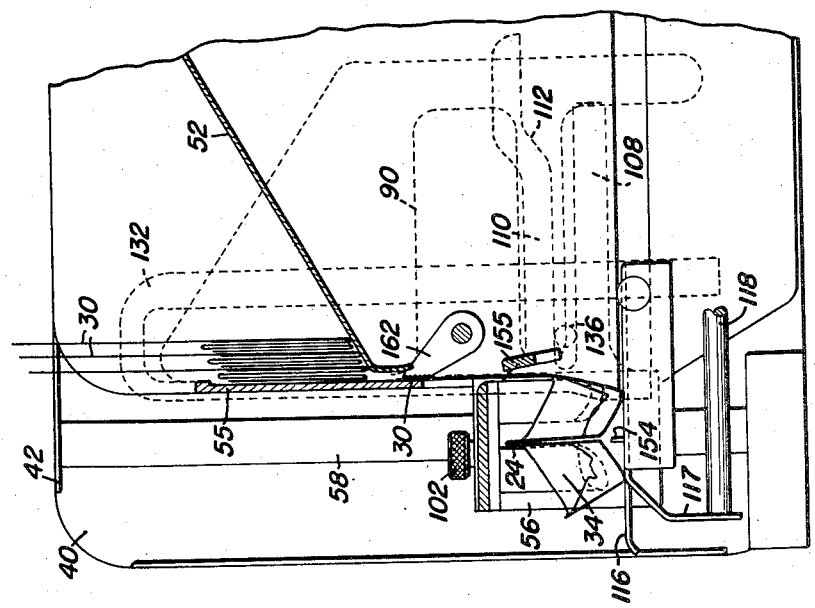
INVENTOR.
GLENN B. HATCHER
BY
HIS ATTORNEY March 18, 1958 G. B. HATCHER 2,826,967
CARTON ERECTING MACHINE
Filed May 11, 1956 9 Sheets-Sheet 9
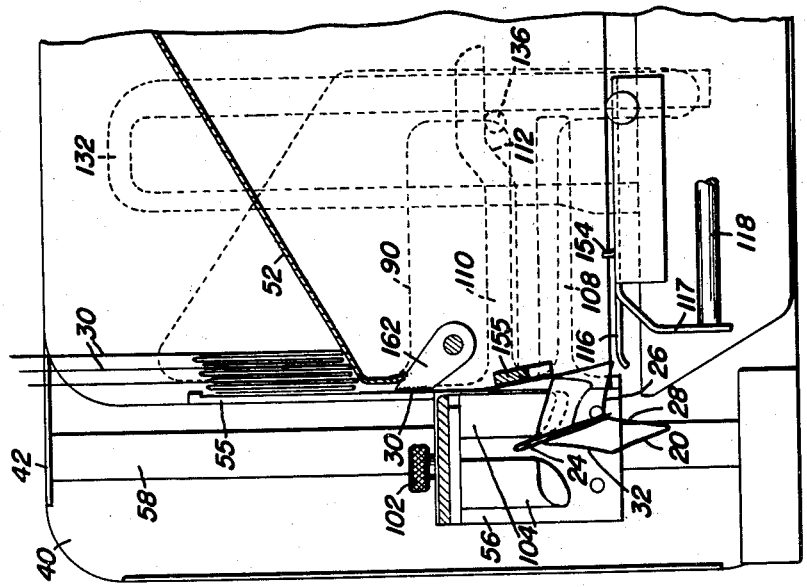
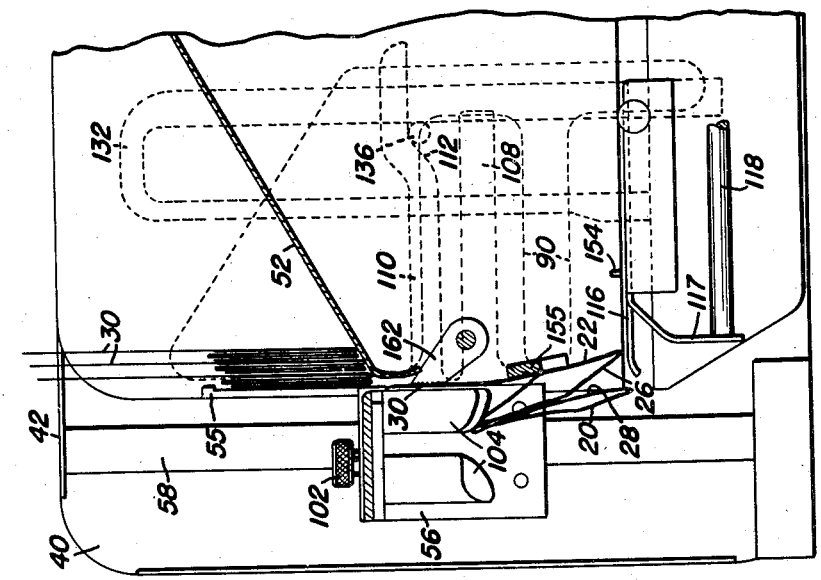
INVENTOR.
GLENN B. HATCHER
BY
HIS ATTORNEY

United States Patent Office 2,826,967
Patented Mar. 18, 1958

2,826,967

CARTON ERECTING MACHINE

Glenn B. Hatcher, Tulsa, Okla., assignor to Bloomer Bros. Company, Newark, N. Y., a corporation of New York Application May 11, 1956, Serial No. 584,322

10 Claims. (Cl. 93—37)

This invention relates to machines for automatically erecting collapsible cellular cartons, such as egg boxes of the type having collapsible walls and transverse cell forming partitions, one object of this invention being the provision of a more practical machine of this type.

Egg cartons of the type referred to commonly are stored and shipped in compact collapsed condition and require erection prior to use. The manual erection of such cartons is an expensive, tedious and time consuming procedure, particularly where they are handled in large quantities. For this reason it is desirable that this step be performed by an automatic mechanical device which will erect cartons without the intervention by the operator, and the provision of such a machine is another object of this invention.

Hand operated semi-automatic devices, and motor driven fully automatic devices have been provided for this purpose, but these devices have tended to be either slow, or excessively complicated and expensive to manufacture and maintain. For this reason another object of this invention is the provision of an improved automatic machine of this character which is rapid and positive in operation and yet is relatively simple, practical and economical to manufacture and maintain.

Another object of this invention is to produce a machine having means for containing a large number of collapsed cartons and which will automatically erect and deliver the cartons to the packers ready for filling.

Another object of this invention is to provide a machine of the character described having a simple straight line motion of operative parts for performing the feeding, erecting and ejecting operations.

Other objects are to provide a machine of the character described having the above advantages, which is capable of economical quantity manufacture, which may be readily assembled and maintained in operation.

To these and other ends the invention resides in certain improvements and combinations of parts, all as will be hereinafter more fully described, the novel features being pointed out in the claims at the end of the specification.

In the drawings:

Fig. 3 is a front elevation view of Fig. 1;

Fig. 10 is a view similar to Fig. 7 showing the mechanism in the fourth step of the erecting cycle;

Fig. 11 is a view similar to Fig. 7 showing the erecting parts in the fifth step of the erecting cycle;

Fig. 12 is a view similar to Fig. 7 showing the erecting parts in the sixth step of the erecting cycle.

Fig. 13 is a view similar to Fig. 7 showing the erecting parts in the seventh or final step of the erecting cycle, and Fig. 14 is a perspective view of an erected carton of the type adapted for use with the machine embodying this invention.

Figure 1:
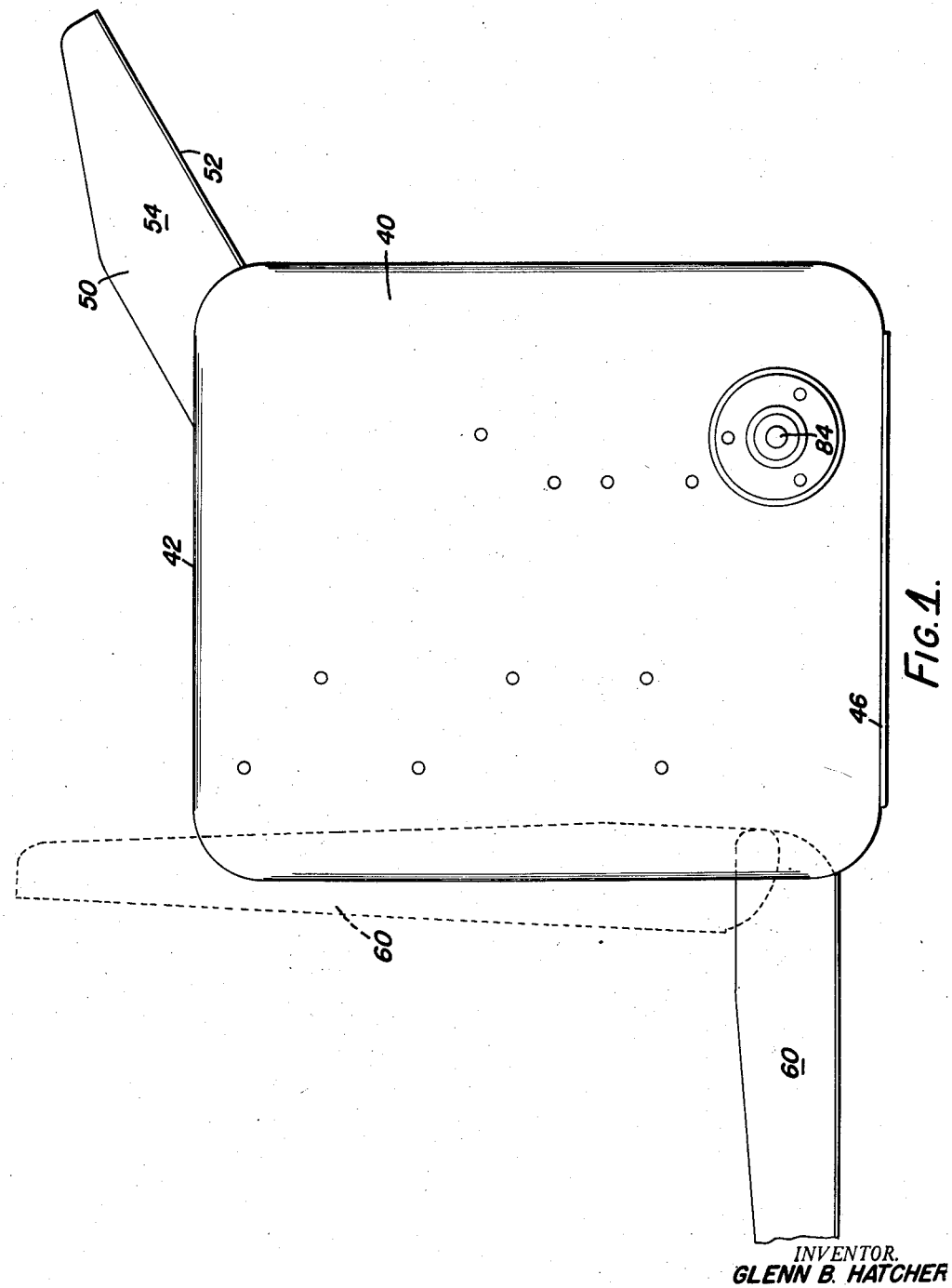
Fig. 1 is a side elevation of an erecting machine embodying the present invention.

The invention herein disclosed is especially adapted for use with cellular cartons such as, for example, the egg carton shown in the patent to William H. Inman, No. 2,277,327. Cartons of this nature are commonly made of a one-piece blank of material cut, scored and folded to form rows of individual cells. One type of these containers comprises a front wall 20, Fig. 14, a rear wall 22, and a central longitudinal portion 24 made by folding up portions between the bottom sections 26 and 28. A top or closure wall 30 is hingedly connected with the top of rear wall 22, and provision is made for detachably attaching the front of closure wall 30 to the top of front wall 20, preferably by means of hooks 31 or other fastening means. A top wall 32 is connected with the tops of front and rear walls 20 and 22 and is cut and scored to form a series of transverse partitions 34 hinged to swing from a horizontal to a vertical position during the erection of the carton to form the separating walls between adjacent cells.

The erecting machine comprising this invention and herewith described for purposes of illustration, preferably comprises a frame for supporting the working parts, electric motor driving means, a hopper for containing a quantity of unopened cartons, feeding and erecting mechanisms for erecting the cartons, and means for ejecting the erected cartons.

Figure 5:
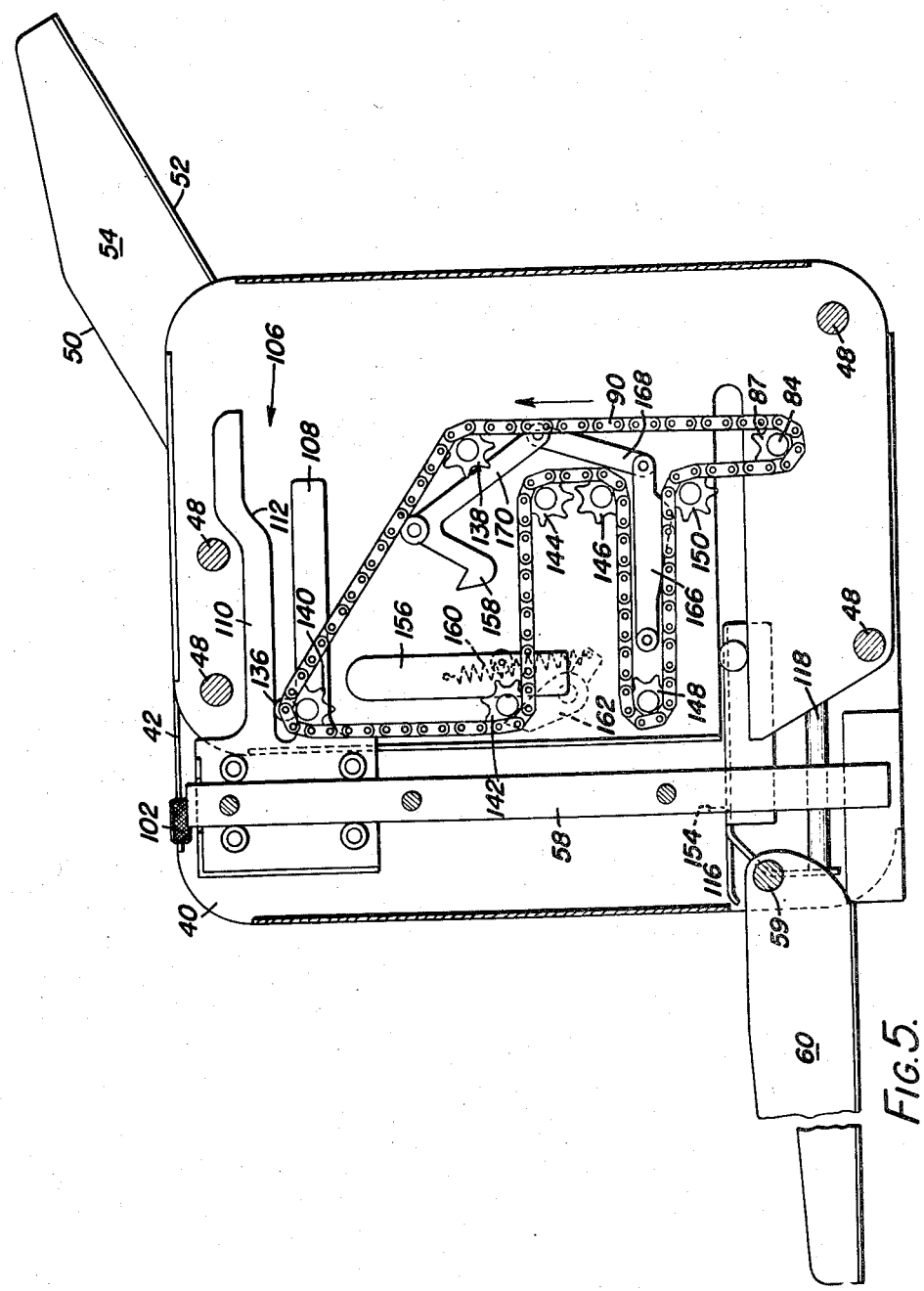
Fig. 5 is a cross sectional view taken substantially along the line 5—5 of Fig. 3.
Figure 6:
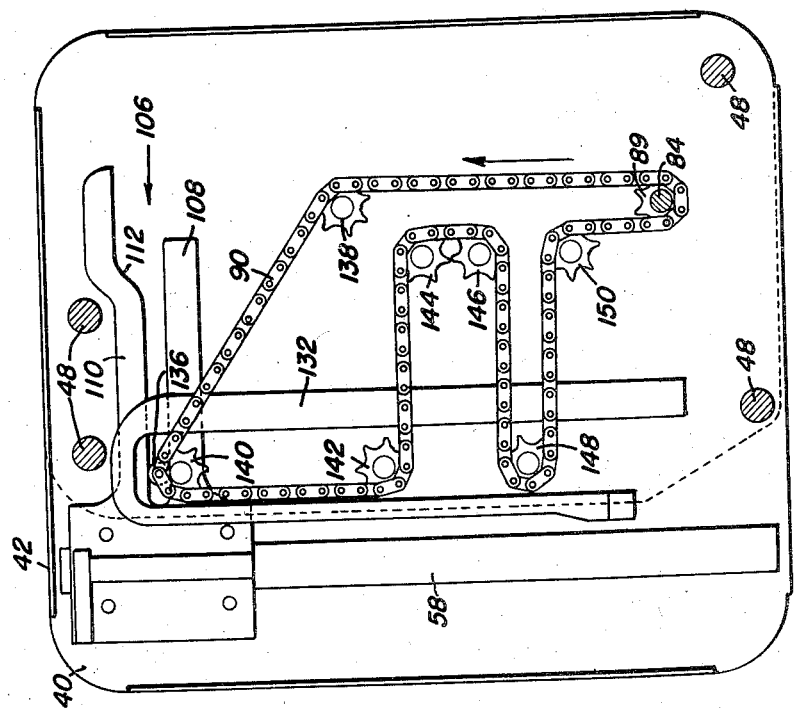
Fig. 6 is a cross sectional view taken substantially along the line 6—6 of Fig. 3.

The frame (Figs. 1 to 3) comprises two pairs of vertical side plates, each pair comprising an inner plate 38 and an outer plate 40, respectively. Outer plates 40 have inwardly turned upper edges 42 (Figs. 2 and 3), and inner plates 38 have outwardly turned upper edges 44 to provide stiffness and to partially cover the space between each pair of plates for protection of the mechanism placed therebetween. Outer plates 40 have outwardly turned lower edges 46 to provide supporting flanges for the machine. Plates 38 and 40 are held in spaced relationship by transversely extending cylindrical spacer members 48 as shown in Figs. 2, 5, and 6, and are drilled to provide spaced bearings for a plurality of transversely extending shafts which support rollers and other moving parts as described below. The driving and actuating means are housed within the vertically extending spaces defined by the side plates described above.

Figure 7:
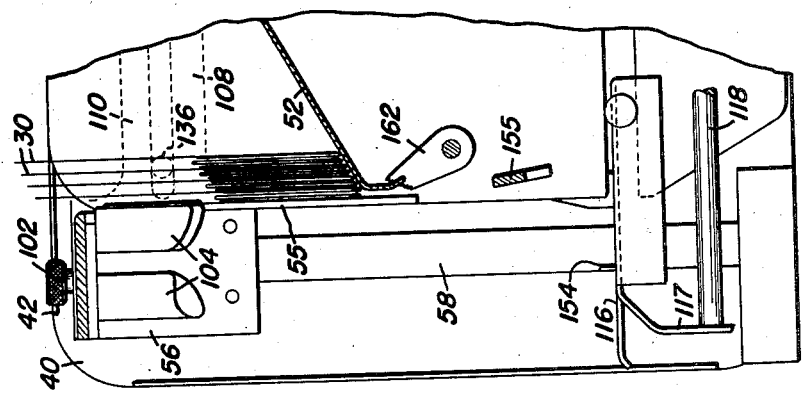
Fig. 7 is a fragmentary cross sectional view taken substantially along line 7—7 of Fig. 3, showing the erecting parts at the initial position in the erecting cycle.

An inclined hopper 50 is mounted between inner plates 38, as shown in Figs. 2 and 3. Hopper 50 comprises an inclined bottom plate 52 and two vertical sides 54, and is formed to hold a plurality of unopened cartons in parallel vertical relationship as shown in Fig. 7. A pair of plates 55 (Fig. 3) are extended inwardly partially across the front of hopper 50, to support the carton. Plates 55 are spaced from the hopper by a distance corresponding substantially to the thickness of a folded carton to leave a gap for the removal of the cartons one by one as described below. An erecting head 56 (Fig. 3) is mounted for vertical movement on a pair of guide members 58 adjacent to the front end of the hopper 50 for removing the unopened cartons, one at a time, from the front of the hopper, and erecting the same. An erected carton tray 69 (Fig. 1) is hingedly attached to the front of the machine by pivots 59 to receive the erected cartons as they are ejected from the erecting mechanism.

Figure 2:
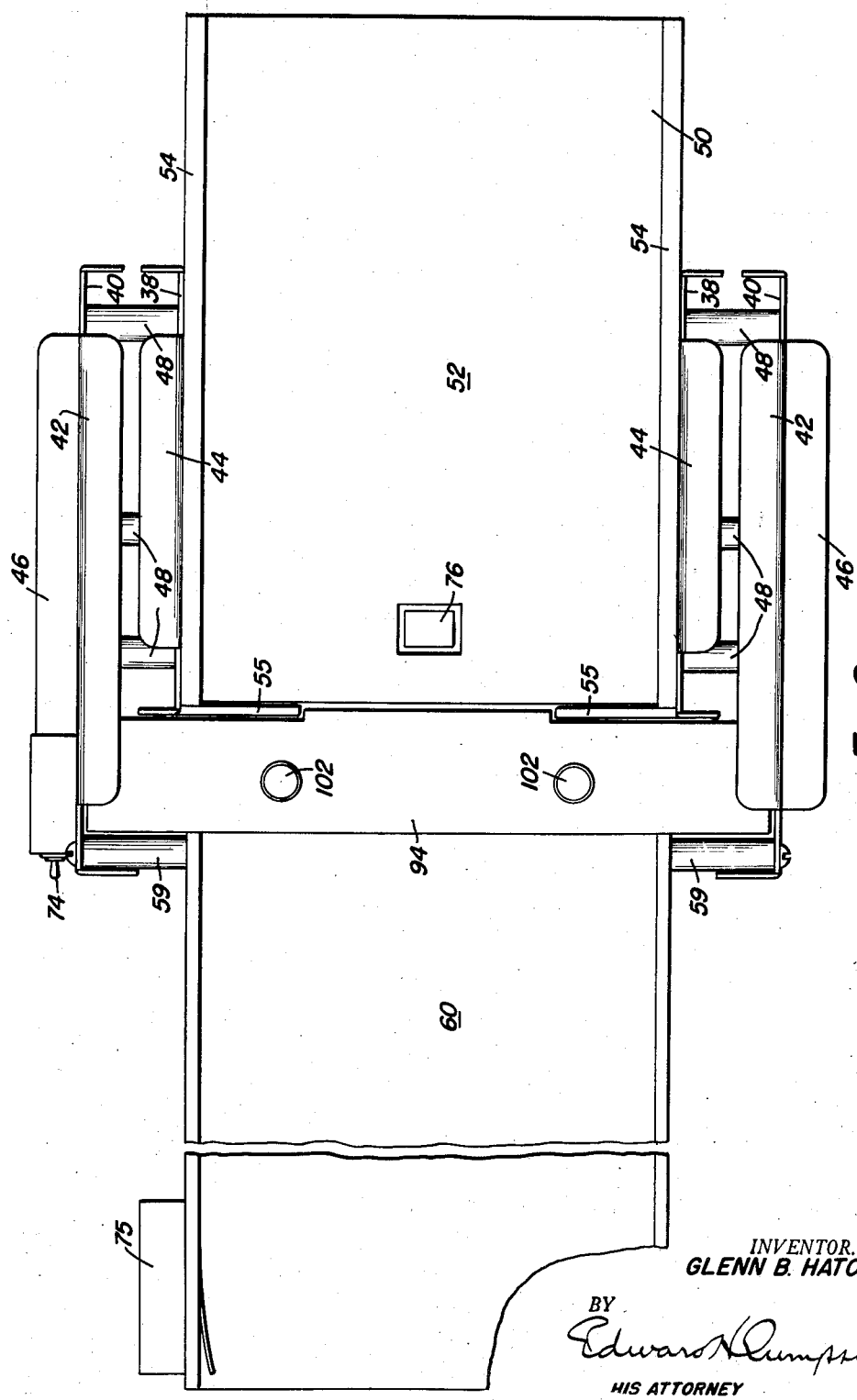
Fig. 2 is a top plan view of the machine of Fig. 1.

Tray 60 may be folded back against the main part of the machine, as shown by the dotted lines in Fig. 1 for facilitating transportation of the machine.

The machine is actuated and driven by an electric motor 62 (Fig. 4) fastened to a platform which is in turn pivotally mounted on a transversely extending shaft 66 which extends from one plate 38 to the other. Motor 62 carries a small pulley 68 (Fig. 4) which is connected to a larger pulley 70 by means of a V-belt 72. Motor 62 is mounted on platform 64 to the rear of shaft 66 so that the weight of the motor tends to pivot the platform in a clockwise direction as viewed in Fig. 4. This pivoting motion of motor 62 and platform 64 is prevented by belt 72 which is thereby automatically maintained under the proper tension by the weight of the motor.

The power for motor 62 is controlled by a switch 74 (Fig. 2) mounted on the front of the machine. The power is also controlled by a second, spring-loaded, pressure-sensitive switch 76 (Figs. 2 and 4) mounted with its operative part protruding through an opening in the bottom of hopper 50 near the front end thereof in position to be maintained closed against the urging of its spring by the weight of the unopened cartons in the hopper. However, when all the cartons have been erected and the hopper is empty, switch 76 is free to open under the urging of its spring to stop the motor and the machine until a fresh supply of unopened cartons has been placed in the hopper. A third switch 75 (Figs. 2 and 4) may be provided at the outer end of tray 60, if desired, to stop the machine when tray 60 is filled with erected cartons.

Large pulley 70 is mounted on a shaft 76 (Fig. 4) which extends between plates 38. A sprocket 78 is mounted on shaft 76 and carries a chain 79 which passes downwardly and rearwardly around an idle sprocket 80, forwardly around a sprocket 82 mounted on a shaft 84, rearwardly around an idle sprocket 86 thence upwardly around another idle sprocket 88 and thence forwardly to sprocket 78. Shaft 84 extends transversely across the entire machine between plates 40. Shaft 84 carries two additional sprockets 87 (Fig. 5) and 89 (Fig. 6), one within the space between each pair of plates 38 and 40. Sprockets 87 and 89 each drive a roller chain 90 which actuates the erecting head in a manner which will hereafter be described.

The erecting head 56 (Fig. 3) comprises a transverse metallic plate member 94 mounted for vertical movement on vertically extending guide members 58. A plastic body member 100 is removably fastened to the under side of plate member 94 by means of a pair of screws 102. Body member 100 has a plurality of downwardly extending plastic finger members 104. The ends of the finger members are beveled to form cam surfaces for purposes to be hereinafter described.

A pair of rearwardly extending bifurcated members shown generally at 106 (Figs. 5 and 6) are attached to the erecting head and extend into the spaces between each pair of plates 38 and 40 for engaging the actuating mechanism contained therein. Members 106 comprise lower fingers 108 extending straight rearwardly, and upper fingers 110 shaped to form an S curve to provide cam surfaces 112 on the lower faces thereof, for purposes to be hereinafter explained.

Figure 4:
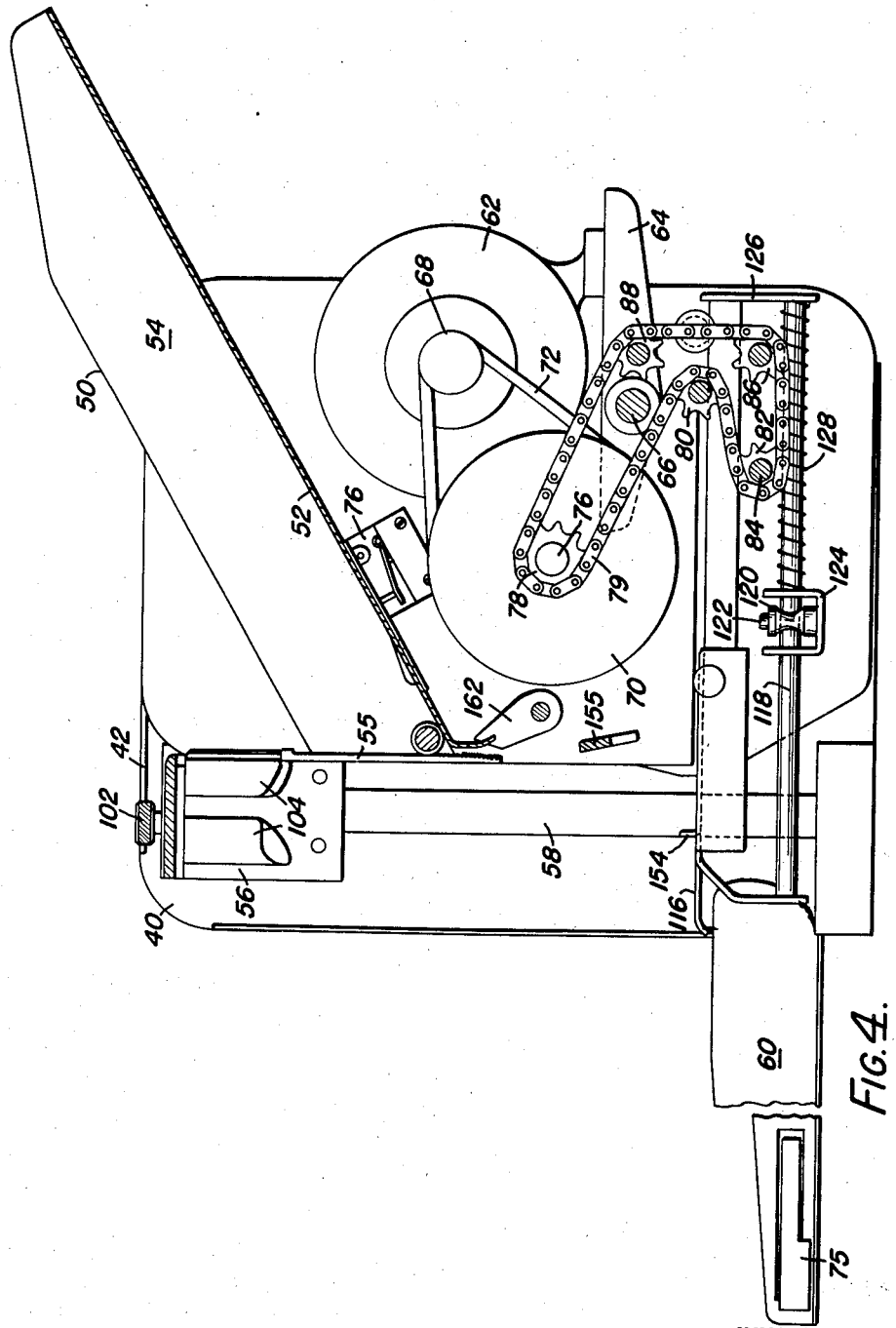
Fig. 4 is a cross sectional view taken substantially along the line 4—4 of Fig. 3.

A horizontally movable planar erecting table 116 (Figs. 3 and 5 and 7 to 11) is mounted on the lower part of the machine. The front surface of table 116 is provided with a pair of downwardly depending lips 117, as shown in Figs. 3 and 4. Table 116 is mounted on a pair of rails 118 (Fig. 4) which are supported by rollers 120 pivotally mounted on vertically extending pins 122 fastened to stationary brackets 124, which are fixed to frame parts of the machine. Rollers 120 thus support table 116 and allow free longitudinal motion in a forward and backward direction. The rear part of table 116 is connected to rails 118 by a bracket 126. A compressed helical spring 128 surrounds the rear part of rails 118 abutting against bracket 126 and against stationary bracket 124. Thus, spring 128 resiliently urges bracket 126 and table 116 rearwardly.

A vertically extending, inverted U-shaped bracket 132 (Figs. 6 and 9 to 13) is fastened to the side of table 116 and extends upwardly into the space between side plates 38 and 40 for engagement with the operative parts positioned therein as hereinafter described.

The movements of the erecting head and the table are controlled by a pair of rollers 136 rigidly fastened to chains 90. Rollers 136 engage the upper and lower surfaces of fingers 108 and 110 respectively, and the inner surfaces of U-shaped brackets 132. Since fingers 108 and 110 are fastened to erecting head 56, vertical movements of rollers 136 cause corresponding vertical movements of the head. In like manner, horizontal movement of the rollers causes a corresponding movement of table 116. However, since the inner surfaces of brackets 132 are substantially vertical, a vertical movement of the rollers merely causes the rollers to roll therealong without causing any movement of the bracket and table 116. In like manner, with one exception, hereinafter explained, horizontal movement of the roller causes no movement of erecting head 56. Since a chain 90 is housed within the space between each set of side plates 38 and 40, and erecting head 56 has a member 106 on each side, erecting head 56 is driven from both sides for smoothness and uniformity of motion. However, since the action taking place between each pair of side plates 38 and 40 is identical, the action occurring within only one pair of side plates will be hereinafter described, with the understanding that the identical action is taking place between the other pair of plates.

Chains 90, driven by sprockets 87 and 89 as described above, travel in a generally counterclockwise direction as shown by the arrows in Fig. 6, passing upwardly from sprocket 87 over an idle sprocket 138, thence upwardly and forwardly to a second idle sprocket 140, thence downwardly to a third idle sprocket 142. From here the chain moves rearwardly to a fourth idle sprocket 144, thence downwardly to a fifth idle sprocket 146 and thence forwardly around a sixth idle sprocket 148. From here the chain moves rearwardly passing around a seventh idle sprocket 150, and thence downwardly to drive sprocket 87.

Figure 9:
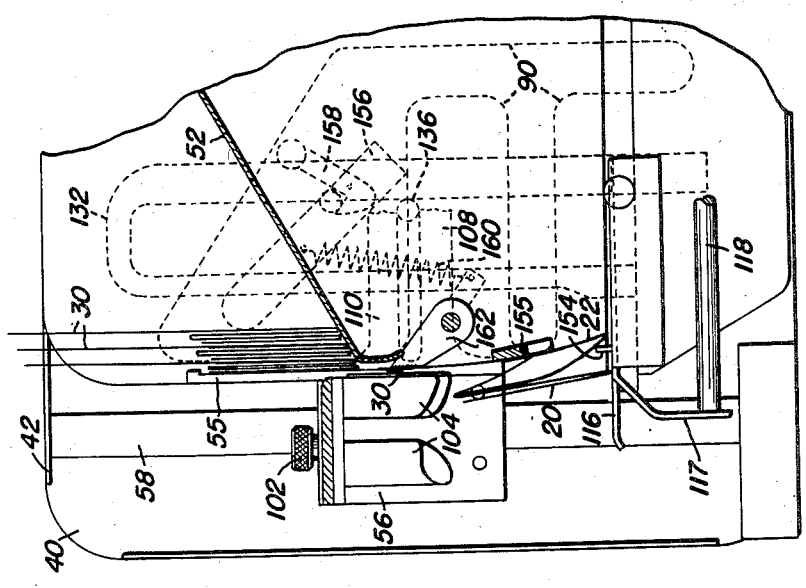
Fig. 9 is a view similar to Fig. 7 showing the erecting parts in the third step of the erecting cycle.
Figure 8:
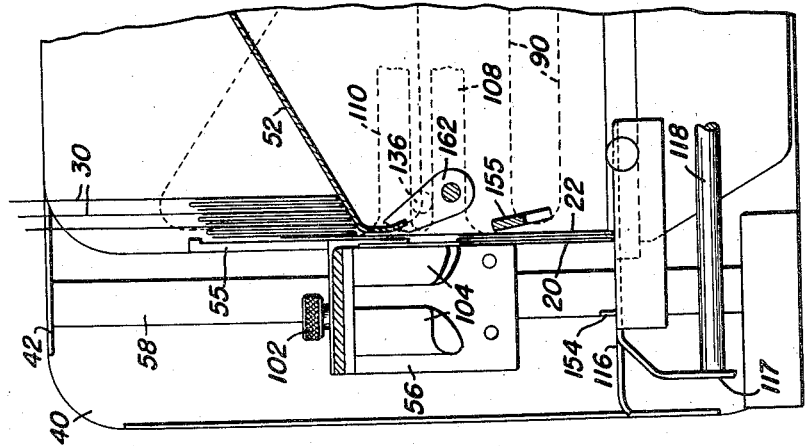
Fig. 8 is a view similar to Fig. 7 showing the erecting parts at the second step of the erecting cycle.

At the start of the erecting cycle, rollers 136 are adjacent idle sprocket 140, erecting head 56 is in its uppermost position, and table 116 is forward as shown in Figs. 5 and 7. As chain 90 moves in a counterclockwise direction, as viewed in Figs. 5 and 6, rollers 136 move around idle roller 140 and travel downwardly. This vertical movement moves erecting head 56 downwardly for the initial movement of the erecting cycle, but has no effect on U-shaped bracket 132 (Fig. 6) connected to the table. The rearward edges of the plastic fingers 104 strike the folded portion of the first carton in the hopper 50 and move the same downwardly to the position as shown in Fig. 8, with the lower edge of the carton engaging the upper surface of table 116. The continued movement of chain 90 moves roller 136 around idle sprocket 142, and thence rearwardly in a horizontal direction. This rearward movement of roller 136 causes it to engage the rear vertical member of U-shaped bracket 132 moving the bracket and table 116 to the rear, but does not affect erecting head 56. As table 116 moves rearwardly, a pair of upwardly extending fingers 154 (Figs. 3 and 7 to 13) fixed to the table strike the lower portion of the front wall of the carton. Further rearward movement of table 116 causes finger 154 to slip off the front wall of the carton and to catch the lower edge of the bottom wall 26 of the carton, moving the lower part of the rear portion of the carton to the rear and beginning the opening process as shown in Fig. 9. The upper edge of the rear wall 22 is supported by a stationary plate 155, so this movement of the lower part of the carton causes the carton to bend, causing rear wall 22 to separate from bottom wall 26, as shown in the figure. At the same time, roller 136 strikes a downwardly depending lever 156 (Fig. 5) pivoting the same rearwardly and upwardly until it is engaged by a pawl 158. A spring 160 connects lever 156 to a second pawl 162, so that when lever 156 is rotated to the rear as described above, pawl 162 is rotated in a counterclockwise direction as viewed in Fig. 9 to engage the closure wall of the carton, clamping the same against plates 54 to prevent further downward movement thereof until the pawl is released. As roller 136 passes over its idle sprocket 144 and moves downwardly, erecting head 56 is moved downwardly for a short distance, causing the upper part of fingers 104 to strike the top edge of the rear wall of the carton. The bottom surface of the rear fingers of the erecting head are beveled downwardly and rearwardly as shown, and therefore force the top of the central partition 24 of the carton forwardly continuing the opening or distending motion as shown in Fig. 10. While this motion is taking place, the table continues its rearward motion moving out of engagement with the bottom of the carton as shown in Figs. 10 and 11. However, vertical movement of the carton as a whole is effectively prevented by pawls 162 which have securely gripped closure flap 30 of the carton as described above. Thus, the back wall of the carton cannot move vertically but the front parts, including the longitudinal partition 24, are free to pivot outwardly and downwardly as shown in Figs. 10 and 11 under the influence of the beveled surfaces of the fingers of the erecting head. At the same time the sidewardly beveled surfaces of these fingers begin to pivot transverse partitions 34 to the left and right in order to form the separations of the cells.

Roller 136 then passes around idle sprocket 146 and moves forwardly moving table 116 to its forward direction. At the same time, roller 136 strikes cam surface 112 of finger 108, moving the erecting head upwardly slightly so as to clear the front edge of the table on its forward movement. As table 116 moves forwardly, the leading edge thereof striking the depending edge of the forward part of the carton forcing the same to pivot forwardly and upwardly onto the front fingers of erecting head 56 to complete the erecting movement and to open the cells on the front half of the carton. Then, with the bottom of the carton firmly supported by table 116, the erecting head makes a final downward movement to complete the erection of the carton as roller 136 moves around idle roller 148. The roller then proceeds rearwardly moving erecting table 116 as it goes. On this rearward journey roller 136 strikes a cam surface on a lever 166 causing the same to pivot upwardly in a counterclockwise direction as viewed in Fig. 5, moving a link 168 upwardly. Link 168 is pivotally attached to a second link 170 which is rigidly attached to pawl 158. Thus, this upward movement of lever 166 causes pawl 158 to rotate slightly in a counterclockwise direction, releasing lever 156 which thereupon pivots in a clockwise direction under the urging of spring 160. This releases the tension on pawl 162 which frees the carton for further downward movement.

As roller 136 passes around idle sprocket 150 it moves erecting head 56 downwardly. This downward movement of the erecting head moves the carton downwardly and causes fingers 104 to be further inserted in the openings in the carton, completing the folding of dividers 34 to form the side walls of the egg containing cells, and bringing the erecting head to its lowermost position to eject the erected carton on tray 60. Roller 136 then moves around drive sprocket 87 and proceeds upwardly to idle sprocket 138, and thence forwardly to its initial position raising erecting head 56 to its upper position and bringing table 116 forward in preparation for erecting another carton. The forward movement of table 116 causes lips 117 to push the erected carton out onto tray 60 freeing space for the next carton to be erected.

As successive cartons are erected, each one is pushed forwardly onto tray 60, as described above. Each carton pushes the one ahead of it, and thus a continuous procession of erected cartons moves outwardly on tray 60. When the first, or outermost carton reaches the end of the tray, it engages switch 75, opening the same, to stop the machine. When the cartons in tray 60 are removed, switch 75 closes, and the machine automatically erects a fresh supply of cartons. Thus, the machine automatically maintains a supply of erected cartons in tray 60, available for instant use.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:
1. A machine for setting up collapsible cartons of the type having front and rear walls hingedly attached to the opposite sides of the bottom wall, and a top wall having transverse members adapted to be swung downwardly in setting up the carton, said machine comprising a hopper for supporting a stack of collapsed cartons, an erecting means movable relative to said hopper for removing one of said cartons from said hopper, supporting means for supporting the lowermost edge of said carton and movable in a path intersecting the path of movement of said erecting means in timed coordination therewith, driving means for causing said erecting means to move said carton out of said hopper into engagement with said supporting means, driving means for causing said supporting means to move relative to said carton for initiating the erecting movement of said carton, driving means for causing said erecting means to move further into engagement with said carton for partially erecting the rear portions of said transverse members, and causing said supporting means to move in a direction opposite to its earlier movement and into reengagement with the bottom wall of said carton for swinging the front wall of the carton and front portions of said transverse members into engagement with said erecting means for initiating the erection of the front portions of said transverse members, driving means for causing said erecting means to move further into said carton for completing the erection of said transverse members and driving means for moving said supporting means out of engagement with said carton during the final erecting movement of said erecting means.

2. A machine for setting up collapsible cartons of the type having front and rear walls hingedly attached to the opposite sides of the bottom wall, and a top wall having transverse members adapted to be swung at right angles to the top wall and the bottom wall in setting up the carton, said machine comprising a hopper for supporting a stack of collapsed cartons, an erecting means movable relative to said hopper for removing one of said cartons from said hopper, supporting mean for supporting the lowermost edge of said carton and movable in a path intersecting the path of movement of said erecting means in timed coordination therewith, driving means for causing said erecting means to move said carton out of said hopper into engagement with said supporting means, driving means for causing said supporting means to move relative to said carton for initiating the erecting movement of said carton, clamping means for engaging the rear wall of said carton for preventing movement thereof, driving means for causing said erecting means to move further into engagement with said carton for partially erecting the rear portions of said transverse members, and causing said supporting means to move in a direction opposite to its earlier movement and into reengagement with the bottom wall of said carton for swinging the front wall of the carton and front portions of said transverse members into engagement with said erecting means for initiating the erection of the front portions of said transverse members, means for releasing said clamping means, driving means for causing said erecting means to move further into said carton for completing the erection of said transverse members and driving means for moving said supporting means out of engagement with said carton during the final erecting movement of said erecting means.

3. A machine for setting up collapsible cartons of the type having front and rear walls hingedly attached to the opposite sides of the bottom wall, and a top wall having transverse members adapted to be swung at right angles to the top wall and the bottom wall in setting up the carton, said machine comprising a hopper for supporting a stack of collapsed cartons, an erecting means comprising a body portion and a plurality of fingers movable relative to said hopper for removing one of said cartons from said hopper, supporting means for supporting the lowermost edge of said carton and movable in a path intersecting the path of movement of said erecting means in timed coordination therewith, driving means for causing said erecting means to move said carton out of said hopper into engagement with said supporting means, driving means for causing said supporting means to move relative to said carton for initiating the erecting movement of said carton, clamping means for engaging the rear wall of said carton for preventing movement thereof, driving means for causing the fingers on said erecting means to enter said partially erected carton between the front and rear walls thereof for engaging and swinging said transverse means to partially erected position and causing said supporting means to move in a direction opposite to its earlier movement and into reengagement with the bottom wall of said carton for swinging the front wall of the carton and front portions of said transverse members into engagement with said erecting means for initiating the erection of the front portions of said transverse members, means for releasing said clamping means and driving means for causing said finger means to move further into said carton for completing the erection of said transverse members and driving means for moving said supporting means out of engagement with said carton during the final erecting movement of said erecting means.

4. A machine for setting up collapsible cartons of the type having front and rear walls hingedly attached to the opposite sides of the bottom wall, and a top wall having transverse members adapted to be swung at right angles to the top wall and the bottom wall in setting up the carton, said machine comprising a hopper for supporting a stack of collapsed cartons, an erecting means movable relative to said hopper for removing one of said cartons from said hopper, supporting means for supporting the lowermost edge of said carton and movable in a path intersecting the path of movement of said erecting means in timed coordination therewith, finger means on said supporting means for engaging the bottom of said carton, driving means for causing said erecting means to move said carton out of said hopper into engagement with said supporting means, driving means for causing said supporting and finger means to move relative to said carton for engaging the bottom of said carton and moving it transversely for initiating the erecting movement of said carton, clamping means for engaging the rear wall of said carton for preventing movement thereof, driving means for causing said erecting means to move further into engagement with said carton for partially erecting the rear portions of said transverse members, and causing said supporting means to move in a direction opposite to its earlier movement and into reengagement with the bottom wall of said carton for swinging the front wall of the carton and front portions of said transverse members into engagement with said erecting means for initiating the erection of the front portions of said transverse members, means for releasing said clamping means, driving means for causing said erecting means to move further into said carton for completing the erection of said transverse members and driving means for moving said supporting means out of engagement with said carton during the final erecting movement of said erecting means.

5. A machine for setting up collapsible cartons of the type having front and rear walls hingedly attached to the opposite sides of the bottom wall, and a top wall having transverse members adapted to be swung downwardly towards the bottom wall in setting up the carton, said machine comprising a hopper for supporting a stack of collapsed cartons, an erecting means movable relative to said hopper for removing one of said cartons from said hopper, supporting means for supporting the lowermost edge of said carton and movable in a path intersecting the path of movement of said erecting means in timed coordination therewith, driving means for causing said erecting means to move said carton out of said hopper into engagement with said supporting means, driving means for causing said supporting means to move relative to said carton for initiating the erecting movement of said carton, clamping means for engaging the rear wall of said carton for preventing movement thereof, driving means for causing said erecting means to move further into engagement with said carton for partially erecting the rear portions of said transverse members, and causing said supporting means to move in a direction opposite to its earlier movement and into reengagement with the bottom wall of said carton for swinging the front wall of the carton and front portions of said transverse members into engagement with said erecting means for initiating the erection of the front portions of said transverse members, means for releasing said clamping means, driving means for causing said erecting means to move further into said carton for completing the erection of said transverse members, driving means for moving said supporting means out of engagement with said carton during the final erecting movement of said erecting means, and driving means to move said supporting means to engage said erected carton and eject it from the machine.

6. A machine for setting up collapsible cartons of the type having front and rear walls hingedly attached to the opposite sides of the bottom wall, and a top wall having transverse members adapted to be swung downwardly towards the bottom wall in setting up the carton, said machine comprising a hopper for supporting a stack of collapsed cartons, tray means for holding a supply of erected cartons, an erecting means movable relative to said hopper for removing one of said cartons from said hopper, supporting means for supporting the lowermost edge of said carton and movable in a path intersecting the path of movement of said erecting means in timed coordination therewith, driving means for causing said erecting means to move said carton out of said hopper into engagement with said supporting means, driving means for causing said supporting means to move relative to said carton for initiating the erecting movement of said carton, clamping means for engaging the rear wall of said carton for preventing movement thereof, driving means for causing said erecting means to move further into engagement with said carton for partially erecting the rear portions of said transverse members, and causing said supporting means to move in a direction opposite to its earlier movement and into reengagement with the bottom wall of said carton for swinging the front wall of the carton and front portions of said transverse members into engagement with said erecting means for initiating the erection of the front portions of said transverse members, means for releasing said clamping means, driving means for causing said erecting means to move further into said carton for completing the erection of said transverse members, driving means for moving said supporting means out of engagement with said carton during the final erecting movement of said erecting means, driving means to move said supporting means to engage said erected carton and eject it into said erected carton tray means, switch means in said hopper means for deactivating said driving means when said hopper is empty, and switch means in said tray means for deactivating said driving means when said tray means is filled with erected cartons.

7. A machine for setting up collapsible cartons of the type having front and rear walls hingedly attached to the opposite sides of the bottom wall, and a top wall having transverse members adapted to be swung downwardly towards the bottom wall in setting up the carton, said machine comprising a hopper for supporting a stack of collapsed cartons, an erecting means movable relative to said hopper for removing one of said cartons from said hopper, supporting means for supporting the lowermost edge of said carton and movable in a path intersecting the path of movement of said erecting means in timed coordination therewith, driving means for causing said erecting means to move said carton out of said hopper into engagement with said supporting means, driving means for causing said supporting means to move relative to said carton for initiating the erecting movement of said carton, clamping means for engaging the rear wall of said carton for preventing movement thereof, driving means for causing said erecting means to move further into engagement with said carton for partially erecting the rear portions of said transverse members, and causing said supporting means to move in a direction opposite to its earlier movement and into reengagement with the bottom wall of said carton for swinging the front wall of the carton and front portions of said transverse members into engagement with said erecting means for initiating the erection of the front portions of said transverse members, means for releasing said clamping means, driving means for causing said erecting means to move further into said carton for completing the erection of said transverse members, and driving means for moving said supporting means out of engagement with said carton during the final erecting movement of said erecting means, said driving means comprising endless flexible means for engaging and actuating said erecting, clamping, and supporting means in predetermined timed sequence to actuate the same and motor means for driving said endless flexible means.

8. A machine for setting up collapsible cartons of the type having front and rear walls hingedly attached to the opposite sides of the bottom wall, and a top wall having transverse members adapted to be swung downwardly towards the bottom wall in setting up the carton, said machine comprising a hopper for supporting a stack of collapsed cartons, an erecting means movable relative to said hopper for removing one of said cartons from said hopper, supporting means for supporting the lowermost edge of said carton and movable in a path intersecting the path of movement of said erecting means in timed coordination therewith, driving means for causing said erecting means to move said carton out of said hopper into engagement with said supporting means, driving means for causing said supporting means to move relative to said carton for initiating the erecting movement of said carton, clamping means for engaging the rear wall of said carton for preventing movement thereof, driving means for causing said erecting means to move further into engagement with said carton for partially erecting the rear portions of said transverse members, and causing said supporting means to move in a direction opposite to its earlier movement and into reengagement with the bottom wall of said carton for swinging the front wall of the carton and front portions of said transverse members into engagement with said erecting means for initiating the erection of the front portions of said transverse members, means for releasing said clamping means, driving means for causing said erecting means to move further into said carton for completing the erection of said transverse members, and driving means for moving said supporting means out of engagement with said carton during the final erecting movement of said erecting means, said driving means comprising endless flexible means, means for guiding said flexible means in upward, downward, backward and forward directions in predetermined sequence, means attached to said erecting, clamping, and holding means and extending into the path of said flexible driving means for engagement therewith, and motor means for driving said flexible means.

9. A machine for setting up collapsible cartons of the type having front and rear walls hingedly attached to the opposite sides of the bottom wall, and a top wall having transverse members adapted to be swung downwardly towards the bottom wall in setting up the carton, said machine comprising a hopper for supporting a stack of collapsed cartons, an erecting means movable relative to said hopper for removing one of said cartons from said hopper, supporting means for supporting the lowermost edge of said carton and movable in a path intersecting the path of movement of said erecting means in timed coordination therewith, driving means for causing said erecting means to move said carton out of said hopper into engagement with said supporting means, driving means for causing said supporting means to move relative to said carton for initiating the erecting movement of said carton, clamping means for engaging the rear wall of said carton for preventing movement thereof, driving means for causing said erecting means to move further into engagement with said carton for partially erecting the rear portions of said transverse members, and causing said supporting means to move in a direction opposite to its earlier movement and into reengagement with the bottom wall of said carton for swinging the front wall of the carton and front portions of said transverse members into engagement with said erecting means for initiating the erection of the front portions of said transverse members, means for releasing said clamping means, driving means for causing said erecting means to move further into said carton for completing the erection of said transverse members and driving means for moving said supporting means out of engagement with said carton during the final erecting movement of said erecting means, said driving means comprising endless flexible means, means for guiding said flexible driving means in upward, downward, backward and forward directions in predetermined sequence, roller means fixed to said flexible driving means and moving therewith, means attached to said erecting, clamping and supporting means and projecting into the path of said roller means for engagement therewith, and motor means for driving said flexible driving means.

10. A machine for setting up collapsible cartons of the type having front and rear walls hingedly attached to the opposite sides of the bottom wall, and a top wall having transverse members adapted to be swung downwardly towards the bottom wall in setting up the carton, said machine comprising a hopper for supporting a stack of collapsed cartons, an erecting means movable relative to said hopper for removing one of said cartons from said hopper, supporting means for supporting the lowermost edge of said carton and movable in a path intersecting the path of movement of said erecting means in timed coordination therewith, driving means for causing said erecting means to move said carton out of said hopper into engagement with said supporting means, driving means for causing said supporting means to move relative to said carton for initiating the erecting movement of said carton, clamping means for engaging the rear wall of said carton for preventing movement thereof, driving means for causing said erecting means to move further into engagement with said carton for partially erecting the rear portions of said transverse members, and causing said supporting means to move in a direction opposite to its earlier movement and into reengagement with the bottom wall of said carton for swinging the front wall of the carton and front portions of said transverse members into engagement with said erecting means for initiating the erection of the front portions of said transverse members, means for releasing said clamping means, driving means for causing said erecting means to move further into said carton for completing the erection of said transverse members, and driving means for moving said supporting means out of engagement with said carton during the final erecting movement of said erecting means, said driving means comprising endless flexible chain means, rotatable sprocket means for guiding said flexible chain means in upward, downward, backward and forward directions in predetermined sequence, roller means fixed to said flexible chain means and moving therewith, means attached to said erecting, clamping and supporting means and projecting into the path of said roller means for engagement therewith, and motor means for driving said flexible driving means.

No references cited.